(12) United States Patent
Lu et al.

(10) Patent No.: US 8,311,088 B2
(45) Date of Patent: Nov. 13, 2012

(54) METHOD AND SYSTEM FOR IMAGE PROCESSING IN A MICROPROCESSOR FOR PORTABLE VIDEO COMMUNICATION DEVICES

(75) Inventors: Paul Lu, Los Altos, CA (US); Weiping Pan, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 1859 days.

(21) Appl. No.: 11/052,169

(22) Filed: Feb. 7, 2005

(65) Prior Publication Data

US 2006/0176954 A1    Aug. 10, 2006

(51) Int. Cl.
- H04N 7/14 (2006.01)
- H04N 7/24 (2011.01)
- H04N 7/01 (2006.01)
- H04N 9/80 (2006.01)
- H04N 9/804 (2006.01)
- H04N 9/877 (2006.01)

(52) U.S. Cl. .......... 375/240; 375/240.01; 375/240.25

(58) Field of Classification Search ........... 375/240, 375/240.01
See application file for complete search history.

(56) References Cited

U.S. PATENT DOCUMENTS

| | | | | |
|---|---|---|---|---|
| 4,847,677 | A | * | 7/1989 | Music et al. ............ 375/240.01 |
| 5,598,525 | A | * | 1/1997 | Nally et al. ................ 345/546 |
| 5,781,788 | A | | 7/1998 | Woo et al. |
| 5,812,204 | A | * | 9/1998 | Baker et al. ................ 348/453 |
| RE36,015 | E | * | 12/1998 | Iu .............................. 348/415.1 |
| 5,870,146 | A | * | 2/1999 | Zhu ........................... 375/240.03 |
| 6,233,389 | B1 | * | 5/2001 | Barton et al. .................. 386/46 |
| 6,240,516 | B1 | * | 5/2001 | Vainsencher ............... 713/190 |
| 6,351,765 | B1 | * | 2/2002 | Pietropaolo et al. ......... 709/218 |

(Continued)

FOREIGN PATENT DOCUMENTS

CN    1381990    11/2002

(Continued)

OTHER PUBLICATIONS

Bidermann, W.; El Gamal, A.; Ewedemi, S.; Reyneri, J.; Tian, H.; Wile, D.; Yang, D., "A 0.18 μm high dynamic range NTSC/PAL imaging system-on-chip with embedded DRAM frame buffer", in _ Solid-State Circuits Conference, 2003. Digest of Technical Papers. ISSCC. 2003 IEEE International_, vol. 1, pp. 212-488, Feb. 2003.*

(Continued)

*Primary Examiner* — David Czekaj
*Assistant Examiner* — David N Werner
(74) *Attorney, Agent, or Firm* — Sterne, Kessler, Goldstein & Fox PLLC

(57) ABSTRACT

Methods and systems for processing video data are provided herein. Aspects of the method may comprise receiving on a chip, a plurality of video frames and storing a portion of the received video frames in a memory on the chip. A first portion of the stored video frames may be decoded on the chip and a second portion of the stored video frames may be encoded on the chip during the decoding. A third portion of the stored video frames may be converted from an input video format to a YUV video format. A reference frame corresponding to the converted third portion may be identified from the stored video frames. After conversion, the converted third portion of the received video frames may be utilized as the reference frame for estimating/encoding, or compensating/decoding temporal motion of the subsequently received video frames.

37 Claims, 11 Drawing Sheets

| FRAME | FRAMEa | FRAMEb | FRAMEc |
|---|---|---|---|
| Frame 1: Start | DEC reference | | ENC reference |
| After encoding | | ENC current | |
| After decoding | | | DEC current |
| Frame 2: Start | | ENC reference | DEC reference |
| After encoding | ENC current | | |
| After decoding | | DEC current | |
| Frame 3: Start | ENC reference | DEC reference | |
| After encoding | | | ENC current |
| After decoding | DEC current | | |

U.S. PATENT DOCUMENTS

| | | | |
|---|---|---|---|
| 6,542,541 | B1 | 4/2003 | Luna et al. |
| 6,618,442 | B1 * | 9/2003 | Chen et al. ............... 375/240.2 |
| 6,658,056 | B1 * | 12/2003 | Duruoz et al. ............... 375/240 |
| 6,717,989 | B1 * | 4/2004 | Simsic et al. ............ 375/240.26 |
| 6,862,278 | B1 * | 3/2005 | Chang et al. ................. 370/389 |
| 7,324,592 | B2 * | 1/2008 | Vetro et al. .............. 375/240.01 |
| 2002/0071485 | A1 * | 6/2002 | Caglar et al. ............ 375/240.01 |
| 2002/0191692 | A1 * | 12/2002 | Fallon et al. ................. 375/240 |
| 2003/0206582 | A1 * | 11/2003 | Srinivasan et al. ....... 375/240.01 |
| 2006/0083306 | A1 * | 4/2006 | Hsu ......................... 375/240.15 |
| 2009/0195535 | A1 * | 8/2009 | Kanumuri et al. ............ 345/418 |

FOREIGN PATENT DOCUMENTS

| | | |
|---|---|---|
| EP | 1689186 A1 * | 8/2006 |
| WO | WO-02/087248 A | 10/2002 |

OTHER PUBLICATIONS

Panasonic Corp., Panasonic Product Timeline, http://www.panasonic.net/history/corporate/products/inp1985.html (last visited Jun. 29, 2010).*

David Macaulay, _The Way Things Work_ 262-63 (1988).*

Advanced Television Sys. Comm. Inc., _ATSC Digital Television Standard: Part 4—MPEG-2 Video System Characteristics_ (Jun. 2009).*

P.N. Tudor, _MPEG-2 Video Compression_, Electronics & Comm. J., Dec. 1995.*

Klein & Ross Intl Co., _TV Tuner Card User Manual_ (Nov. 2003).*

Pinouts.ru, VGA Connector Pinout, http://pinouts.ru/Video/VGA15_pinout.shtml (last visited Jun. 30, 2010).*

ITU Recommendation H.261, "Video Codec for Audiovisual Services at p.×64 kbits/s" (Dec. 1990).*

Takahashi M et al, "A Scalable MPEG-4 Video Codec Architecture for IMT-2000 Multimedia Applications", Circuits and Systems 2000, Proceedings, ISCAS 2000 Geneva, The 2000 IEEE International Symposium on May 28-31, 2000, Piscataway, NJ, USA, IEEE, vol. 2, May 28, 2000, pp. 188-191, XP010502692 ISBN: 0-7803-5482-6.

Takahashi et al., "A 60-MHz 240-m MPEG-4 Videophone LSI with 16-Mb Embedded DRAM", IEEE Journal of Solid-State Circuits, vol. 35, No. 11, Nov. 2000, 9 pages.

Fairfield, D. J., "A Multi-Standard Video Codec Architecture for the ISA/VL Bus", Proceedings of the International Conference on Signal Processing Applications and Technology, Oct. 18, 1994, vol. 2, pp. 1173-1178, XP000602802.

* cited by examiner

320

| FRAME | FRAMEa | FRAMEb | FRAMEc |
|---|---|---|---|
| Frame 1: Start | DEC reference | | ENC reference |
| After encoding | | ENC current | |
| After decoding | | | DEC current |
| Frame 2: Start | | ENC reference | DEC reference |
| After encoding | ENC current | | |
| After decoding | | DEC current | |
| Frame 3: Start | ENC reference | DEC reference | |
| After encoding | | | ENC current |
| After decoding | DEC current | | |

FIG. 3B

METHOD AND SYSTEM FOR IMAGE PROCESSING IN A MICROPROCESSOR FOR PORTABLE VIDEO COMMUNICATION DEVICES

CROSS-REFERENCE TO RELATED APPLICATIONS/INCORPORATION BY REFERENCE

This application is related to the following applications:

U.S. patent application Ser. No. 11/052,170, filed Feb. 7, 2005, and entitled "Method And System For Encoding Variable Length Code (VLC) In A Microprocessor";

U.S. patent application Ser. No. 11/053,001, filed Feb. 7, 2005, and entitled "Method And System For Video Compression And Decompression (CODEC) In A Microprocessor";

U.S. patent application Ser. No. 11/053,000, filed Feb. 7, 2005, and entitled "Method And System For Video Motion Processing In A Microprocessor"; and U.S. patent application Ser. No. 11/053,214, filed Feb. 7, 2005, and entitled "Method And System For Decoding Variable Length Code (VLC) In A Microprocessor".

The above stated patent applications are hereby incorporated herein by reference in their entirety.

BACKGROUND OF THE INVENTION

Video compression and decompression techniques, as well as different display standards, are utilized by conventional video processing systems, such as portable video communication devices, during recording, transmission, storage, and playback of video information. For example, quarter common intermediate format (QCIF) may be utilized for playback and recording of video information, such as videoconferencing, utilizing portable video communication devices, for example, portable video telephone devices. The QCIF format is an option provided by the ITU-T's H.261 standard for videoconferencing codes. It produces a color image of 144 non-interlaced luminance lines, each containing 176 pixels. The frame rate for videoconferencing may be up to 15 frames per second (fps). QCIF provides approximately one quarter the resolution of the common intermediate format (CIF) with resolution of 288 luminance (Y) lines each containing 352 pixels.

Conventional video processing systems for portable video communication devices, such as video processing systems implementing the QCIF format, utilize video encoding and decoding techniques to compress video information during transmission, or for storage, and to decompress elementary video data prior to communicating the video data to a display. The video compression and decompression (CODEC) techniques, such as variable length coding (VLC), discrete cosine transformation (DCT), quantization, and/or motion estimation, in conventional video processing systems for portable video communication devices utilize a significant part of the computing and memory resources of a general purpose central processing unit (CPU) of a microprocessor, or other embedded processor, for computation-intensive tasks and data transfers during encoding and/or decoding of video data. The general purpose CPU, however, handles other real-time processing tasks, such as communication with other modules within a video processing network during a video teleconference utilizing the portable video communication devices, for example. The increased amount of computation-intensive video processing tasks and data transfer tasks executed by the CPU and/or other processor, in a conventional QCIF video processing system results in a significant decrease in the video quality that the CPU or processor may provide within the video processing network.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method for processing video data, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 3B illustrates an exemplary rotating buffer scheme within an on-chip memory (OCM) module that may be utilized in connection with the microprocessor of FIG. 2, for example, in accordance with an embodiment of the invention.

DETAILED DESCRIPTION OF THE INVENTION

Certain aspects of the invention may be found in a method and system for on-chip processing of video data. In one aspect of the invention, computation-intensive video processing and data transfer tasks for encoding/decoding video information in a portable video communication device, such as a QCIF-enabled portable video communication device, may be significantly improved by utilizing one or more hardware accelerators within the microprocessor of the portable device. The hardware accelerators may be adapted to offload most of the computation-intensive encoding and/or decoding tasks from the CPU, which frees up the processor to handle other tasks. This results in increased CPU processing speeds and/or the data transfer speeds within the QCIF video processing network.

In addition, the hardware accelerators may utilize one or more local memory modules for storing intermediate processing results during encoding and/or decoding, thus minimizing the burden on the system bus within the microprocessor and any on-chip memory, such as a level one tightly coupled memory (TCM) and/or level two on-chip memory (OCM) within the microprocessor. The OCM, for example, may be utilized to store YUV-formatted macroblock information prior to encoding and/or RGB-formatted macroblock information after decoding and prior to displaying the decoded video information. The OCM may be utilized to store a plurality of reference frames that may be used for encoding and/or decoding, as well as computational results and/or video data prior to encoding or after decoding and prior to output for displaying.

Figure 1A:
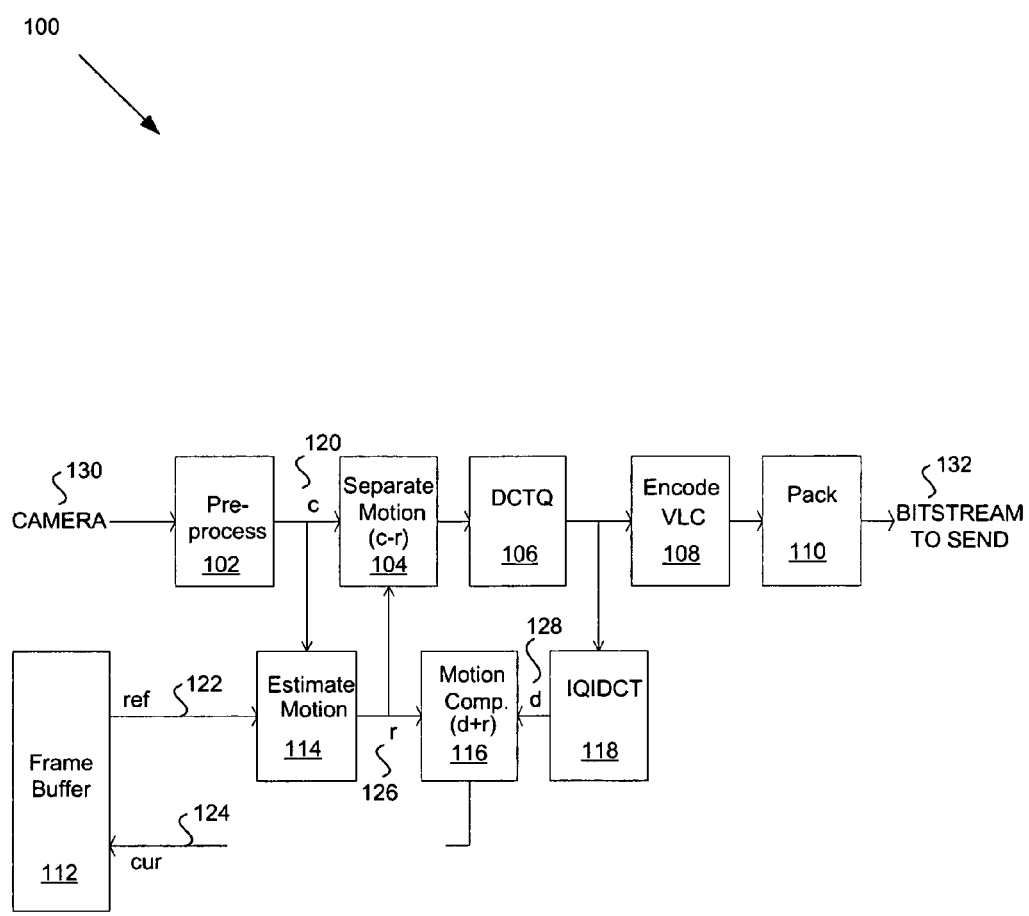
FIG. 1A is a block diagram of an exemplary video encoding system that may be utilized in connection with an aspect of the invention.

FIG. 1A is a block diagram of an exemplary video encoding system that may be utilized in connection with an aspect of the invention. Referring to FIG. 1A, the video encoding system 100 may comprise a pre-processor 102, a motion separation module 104, a discrete cosine transformer and quantizer (DCTQ) module 106, a variable length code (VLC) encoder 108, a packer 110, a frame buffer 112, a motion estimator 114, a motion compensator 116, and an inverse quantizer and inverse discrete cosine transformer (IQIDCT) module 118.

The pre-processor 102 comprises suitable circuitry, logic, and/or code and may be adapted to acquire video data from the camera 130 and convert the camera video data to a YUV format. The motion estimator 114 comprises suitable circuitry, logic, and/or code and may be adapted to acquire one or more reference macroblocks and a current macroblock and determine a most optimal reference macroblock from the acquired reference macroblocks for use during motion separation and/or motion compensation, for example. The motion separation module 104 comprises suitable circuitry, logic, and/or code and may be adapted to acquire a current macroblock and its motion reference and determine one or more estimation errors based on the difference between the acquired current macroblock and its motion reference.

The DCTQ module 106 and the IQIDCT module 118 comprise suitable circuitry, logic, and/or code and may be adapted to transform the estimation errors to frequency coefficients and the frequency coefficients back to estimation errors. For example, the DCTQ module 106 may be adapted to acquire one or more estimation errors and apply a discrete cosine transform and subsequently quantize the acquired estimation errors to obtain frequency coefficients. Similarly, the IQIDCT module 118 may be adapted to acquire one or more frequency coefficients and apply an inverse quantization to the acquired frequency coefficients and subsequently an inverse discrete cosine transform to obtain estimation errors.

The motion compensator 116 comprises suitable circuitry, logic, and/or code and may be adapted to acquire a motion reference and an estimation error and reconstruct a current macroblock based on the acquired motion reference and estimation error. The VLC encoder 108 and the packer 110 comprise suitable circuitry, logic, and/or code and may be adapted to generate an encoded elementary video stream based on motion estimation information and/or quantized frequency coefficients. For example, motion estimation from one or more reference macroblocks may be encoded together with corresponding frequency coefficients to generate the encoded elementary bitstream.

In operation, the pre-processor 102 may acquire video data from the camera 130, such as QCIF video data, and may convert the video data to YUV-formatted video data suitable for encoding. A current macroblock 120 may then be communicated to both the motion separation module 104 and the motion estimator 114. The motion estimator 114 may acquire one or more reference macroblocks 122 from the frame buffer 112 and may determine a motion reference 126 corresponding to the current macroblock 120. The motion reference 126 may then be communicated to both the motion separation module 104 and the motion compensator 116.

The motion separation module 104, having acquired the current macroblock 120 and its motion reference 126, may generate an estimation error based on a difference between the motion reference 126 and the current macroblock 120. The generated estimation error may be communicated to the DCTQ module 106 where the estimation error may be transformed into one or more frequency coefficients by applying a discrete cosine transformation and a quantization process. The generated frequency coefficients may be communicated to the VLC encoder 108 and the packer 110 for encoding into the bitstream 132. The bitstream 132 may also comprise one or more motion reference pointers corresponding to the quantized frequency coefficients of the current macroblock.

The frequency coefficients generated by the DCTQ module 106 may be communicated to the inverse discrete cosine transformer and inverse quantizer module 118. The IQIDCT module 118 may transform the frequency coefficients back to one or more estimation errors 128. The estimation errors 128, together with its motion reference 126, may be utilized by the motion compensator 116 to generate a reconstructed current macroblock 124. The reconstructed macroblock 124 may be stored in the frame buffer 112 and may be utilized as a reference for macroblocks in a subsequent frame generated by the pre-processor 102.

Figure 1B:
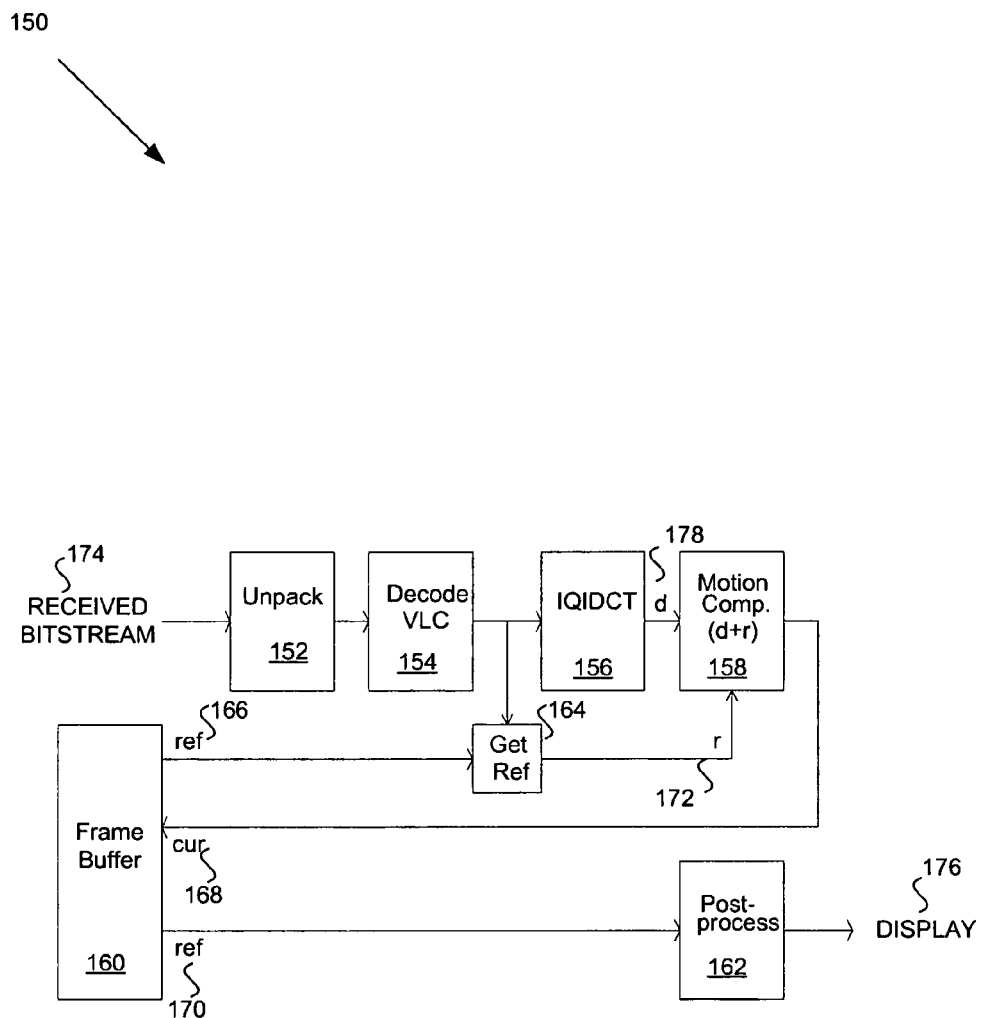
FIG. 1B is a block diagram of an exemplary video decoding system that may be utilized in connection with an aspect of the invention.

FIG. 1B is a block diagram of an exemplary video decoding system that may be utilized in connection with an aspect of the invention. Referring to FIG. 1B, the video decoding system 150 may comprise an unpacker 152, a VLC decoder 154, a reference generating module 164, a frame buffer 160, an IQIDCT module 156, a motion compensator 158, and a post-processor 162.

The unpacker 152 and VLC decoder 154 comprise suitable circuitry, logic, and/or code and may be adapted to decode an elementary video bitstream and generate one or more quantized frequency coefficients and/or corresponding motion reference pointers. The IQIDCT module 156 comprises suitable circuitry, logic, and/or code and may be adapted to transform one or more quantized frequency coefficients to one or more estimation errors. The motion compensator 158 comprises suitable circuitry, logic, and/or code and may be adapted to acquire a motion reference and an estimation error and reconstruct a current macroblock based on the acquired motion reference and estimation error.

In operation, the unpacker 152 and VLC decoder 154 may decode a QCIF elementary video bitstream 174 and generate one or more quantized frequency coefficients and/or corresponding motion reference pointers. The generated quantized frequency coefficients may then be communicated to the reference generating module 164 and the IQIDCT module 156. The reference generating module 164 may acquire one or more reference macroblocks 166 from the frame buffer 160 and may generate a motion reference 172 corresponding to the quantized frequency coefficients. The motion reference 172 may be communicated to the motion compensator 158 for macroblock reconstruction.

The IQIDCT module 156 may transform the quantized frequency coefficients to one or more estimation errors 178. The estimation errors 178 may be communicated to the motion compensator 158. The motion compensator 158 may then reconstruct a current macroblock 168 utilizing the estimation errors 178 and its motion reference 172. The reconstructed current macroblock 168 may be stored in the frame buffer 160 for subsequent post-processing. For example, a reconstructed macroblock 170 may be communicated from the frame buffer 160 to the post-processor 162. The post-processor 162 may convert the YUV-formatted data 170 in frame buffer 160 to an RGB format and communicate the RGB-formatted video data to the display 176 for video displaying in a QCIF video format.

Referring to FIGS. 1A and 1B, in one aspect of the invention, one or more on-chip accelerators may be utilized to offload computation-intensive tasks from the CPU during encoding and/or decoding of video data. For example, one accelerator may be utilized to handle motion related computations, such as motion estimation, motion separation, and/or motion compensation. A second accelerator may be utilized to handle computation-intensive processing associated with discrete cosine transformation, quantization, inverse discrete cosine transformation, and inverse quantization. Another on-chip accelerator may be utilized to handle pre-processing of data, such as RGB-to-YUV format conversion, and post-processing of video data, such as YUV-to-RGB format conversion. Furthermore, one or more on-chip memory (OCM) modules may be utilized to improve data processing speed of the CPU and the microprocessor during video data encoding and/or decoding. For example, an OCM module may be utilized during QCIF-formatted video data and may buffer one or more video frames that may be utilized during encoding and/or decoding. In addition, the OCM module may also comprise buffers for intermediate computational results during encoding and/or decoding such as discrete cosine transformation (DCT) coefficients and/or estimation error information.

Figure 2:
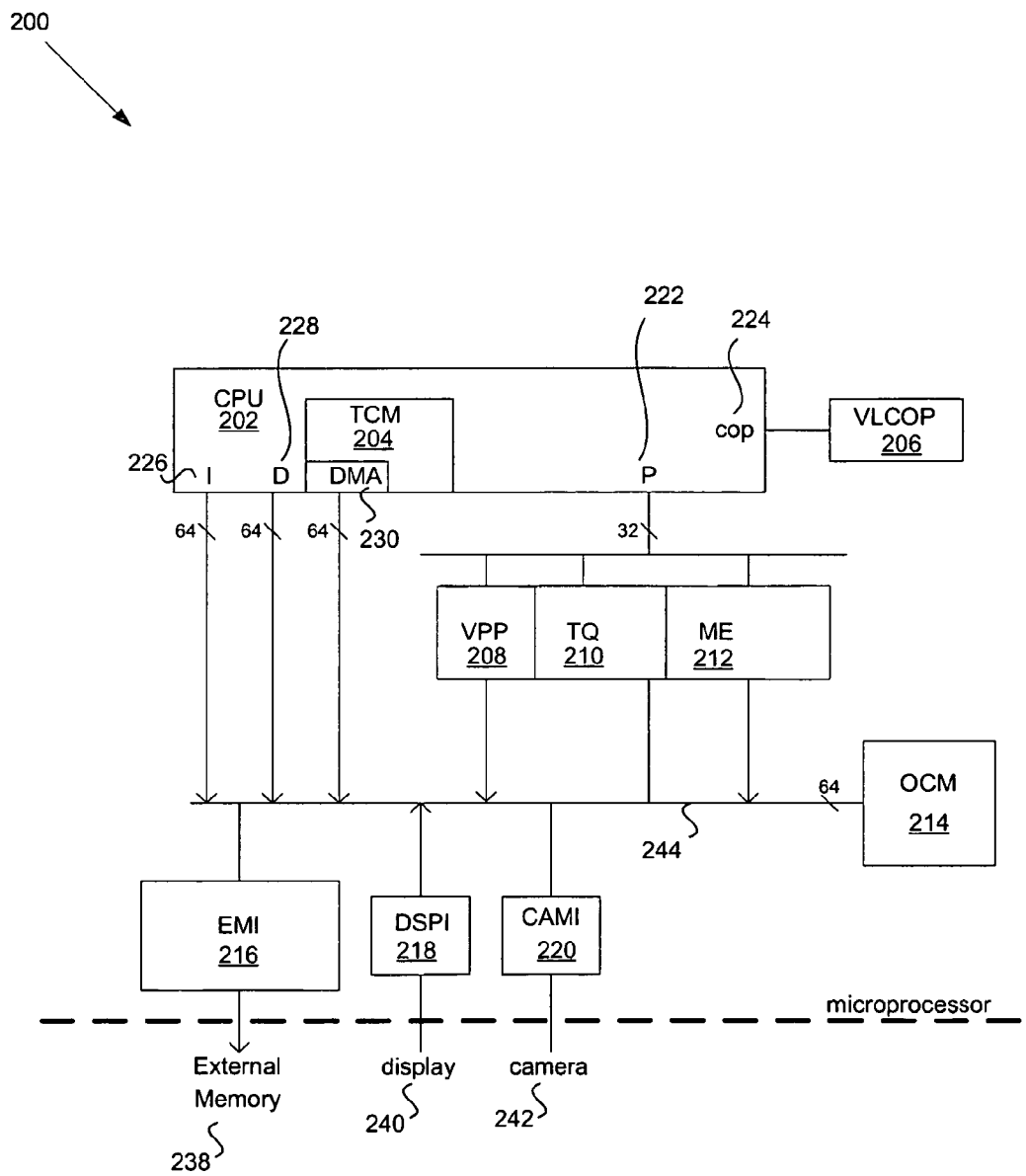
FIG. 2 is a block diagram of the exemplary microprocessor architecture for video compression and decompression utilizing on-chip accelerators, in accordance with an embodiment of the invention.

FIG. 2 is a block diagram of the exemplary microprocessor architecture for video compression and decompression utilizing on-chip accelerators, in accordance with an embodiment of the invention. Referring to FIG. 2, the exemplary microprocessor architecture 200 may comprise a central processing unit (CPU) 202, a variable length code coprocessor (VLCOP) 206, a video pre-processing and post-processing (VPP) accelerator 208, a transformation and quantization (TQ) accelerator 210, a motion engine (ME) accelerator 212, an on-chip memory (OCM) 214, an external memory interface (EMI) 216, a display interface (DSPI) 218, and a camera interface (CAMI) 242. The EMI 216, the DSPI 218, and the CAMI 220 may be utilized within the microprocessor architecture 200 to access the external memory 238, the display 240, and the camera 242, respectively.

The CPU 202 may comprise an instruction port 226, a data port 228, a peripheral device port 222, a coprocessor port 224, tightly coupled memory (TCM) 204, and a direct memory access (DMA) module 230. The instruction port 226 and the data port 228 may be utilized by the CPU 202 to acquire the program and to communicate data via bus connections to the system bus 244 during encoding and/or decoding of video information.

The TCM 204 may be utilized within the microprocessor architecture 200 for storage and access to large amount of data without compromising operating efficiency of the CPU 202. The DMA module 230 may be utilized in connection with the TCM 204 to ensure quick access and data transfer of information from the TCM 204 during operating cycles when the CPU 202 is not accessing the TCM 204. In an exemplary aspect of the invention, the TCM 204 may comprise a level one (L1) memory for the CPU 202.

The CPU 202 may utilize the coprocessor port 224 to communicate with the VLCOP 206. The VLCOP 206 may be adapted to assist the CPU 202 by offloading certain variable length code (VLC) encoding and/or decoding tasks. For example, the VLCOP 206 may be adapted to utilize suitable coding techniques, such as code table look-up and/or packing/unpacking of an elementary bitstream, to coordinate encoding/decoding tasks with the CPU 202 on a cycle-by-cycle basis.

The OCM 214 may be utilized within the microprocessor architecture 200 during pre-processing and post-processing of video data during compression and/or decompression. For example, the OCM 214 may be adapted to store camera data communicated from the camera 242 via the CAMI 220 prior to conversion to YUV-formatted video data. The OCM 214 may also be adapted to store YUV-formatted data prior to conversion to RGB-formatted video data and subsequent communication of such data to the video display 240 via the DSPI 218 for displaying in a QCIF format, for example.

In an exemplary aspect of the invention, the OCM 214 may comprise one or more frame buffers that may be adapted to store one or more reference frames utilized during encoding and/or decoding. For example, the OCM 214 may comprise three buffers adapted to store luminance (Y) and chrominance (UV) information for three frames. The three buffers may be adapted to be used within the exemplary microprocessor architecture 200 in a rotating fashion. In addition, the OCM 214 may comprise buffers adapted to store computational results and/or video data prior to encoding or after decoding and prior to output for displaying, such as DCT coefficients and/or estimation error information. The OCM 214 may be accessed by the CPU 202, the VPP accelerator 208, the TQ accelerator 218, the ME accelerator 212, the EMI 216, the DSPI 218, and the CAMI 220 via the system bus 244. In an exemplary aspect of the invention, the OCM 214 may be utilized as a level two (L2) memory for the CPU 202.

The CPU 202 may utilize the peripheral device port 222 to communicate with the on-chip accelerators VPP 208, TQ 210, and ME 212 via a bus connection. The VPP accelerator 208 may comprise suitable circuitry and/or logic and may be adapted to provide video data pre-processing and post-processing during encoding and/or decoding of video data within the microprocessor architecture 200 so that encoded and decoded video data is in a YUV format. For example, the camera 242 may capture video in a line-by-line sequence and in a format specific to the camera 242. The captured data may then be pre-processed by the VPP accelerator 208 to a YUV format suitable for encoding. In addition, the VPP accelerator 208 may be adapted to convert decoded YUV-formatted video data to RGB-formatted video data prior to communicating the data to a video display 240 in a line-by-line sequence, for example. Post-processed video data from the VPP accelerator 208 may be stored in a local line buffer, for example, of the VPP accelerator 208. Post-processed video data in a VPP local line buffer may be in a QCIF format and may be communicated to, or fetched by, the DSPI 218 and subsequently to the display 240 for displaying. In a different aspect of the invention, the CPU 202 may perform post-processing of video data and post-processed data may be stored in the TCM 204 for subsequent communication to the DSPI 218 via the bus 244.

The TQ accelerator 210 may comprise suitable circuitry and/or logic and may be adapted to perform discrete cosine transformation and quantization related processing of video data, including inverse discrete cosine transformation and inverse quantization. The TQ accelerator 210 may also utilize shared memory 232 together with the ME accelerator 212. The ME accelerator 212 may comprise suitable circuitry and/or logic and may be adapted to perform motion estimation, motion separation, and/or motion compensation during encoding and/or decoding of video data within the microprocessor architecture 200. In one aspect of the invention, the ME accelerator 212 may utilize on-chip reference memory 234, on-chip current memory 236, and or the OCM 214 to store reference macroblock data and current macroblock data, respectively, utilized by the ME accelerator 212 during motion estimation, motion separation, and/or motion compensation. By utilizing the VLCOP 206, the VPP accelerator 208, the TQ accelerator 210, the ME accelerator 212, as well as the shared memory 232, the reference memory 234, the current memory 236, and the OCM 214 during encoding and/or decoding of video data, the CPU 202 may be alleviated from computation-intensive tasks during encoding and/or decoding of video data.

Figure 3A:
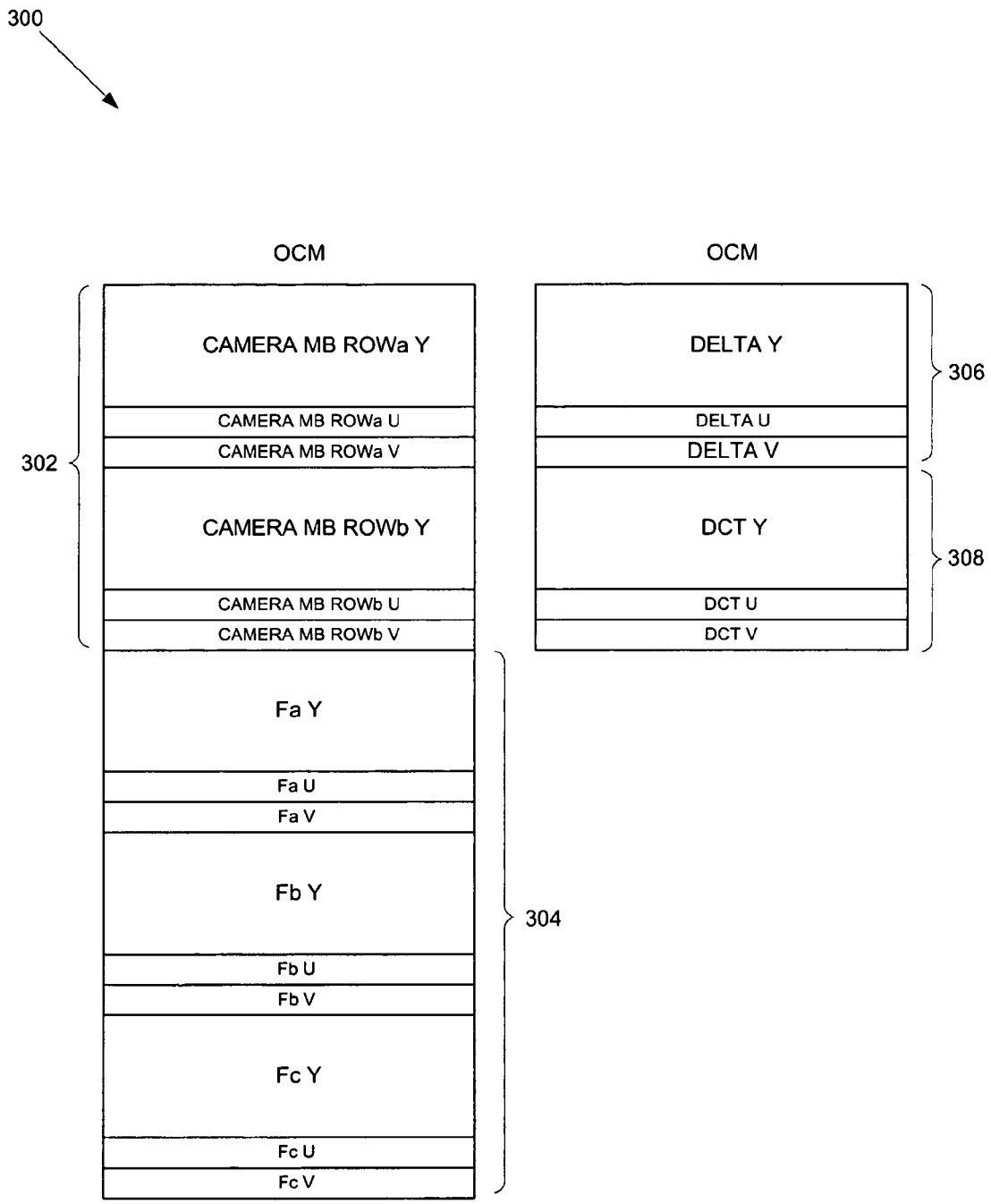
FIG. 3A illustrates architecture for an exemplary on-chip memory module (OCM) that may be utilized in connection with the microprocessor of FIG. 2, for example, in accordance with an embodiment of the invention.

FIG. 3A illustrates architecture for an exemplary on-chip memory module (OCM) that may be utilized in connection with the microprocessor of FIG. 2, for example, in accordance with an embodiment of the invention. Referring to FIG. 3A, the on-chip memory (OCM) architecture 300 may comprise a plurality of buffers, such as camera buffers 302, reference buffers 304, delta buffer 306, and a DCT buffer 308. The OCM architecture 300 may be adapted to store macroblock and/or computational data during encoding and/or decoding of video data. The OCM architecture 300 may be utilized, for example, within the OCM 214 of FIG. 2.

Referring to FIGS. 2 and 3A, at least two camera buffers 302 may be adapted to store pre-processed camera data, which may be YUV-formatted for encoding. Each buffer may be adapted to hold one row of macroblocks. One of the two buffers may be utilized by the VPP accelerator 208 of FIG. 2 to write YUV-formatted video data after conversion by the VPP accelerator 208 of the captured data from CAMI 220 during pre-processing within the microprocessor architecture 200. The second buffer may be utilized by the ME 212 to read YUV-formatted data for motion estimation and separation, while the previous buffer is being filled by the VPP accelerator 208.

The frame buffers 304 may comprise a plurality of frame buffers that may be adapted to store a plurality of reference frames, for example, reference frames Fa, Fb and Fc, which may be utilized during encoding and/or decoding of video data. The delta buffer 306 may be adapted to store a delta, or a difference, between a macroblock and its motion reference. The delta buffer 306 may also store estimation error information based on a determined delta. The DCT buffer 308 may be adapted to store DCT coefficients of a macroblock. In an exemplary aspect of the invention, the delta and/or DCT coefficients may be double-buffered to enable a module writing to the OCM 300 and a module reading from the OCM 300 to operate in parallel.

In an exemplary embodiment of the invention, for a QCIF size video, the buffers within OCM 300 may be arranged utilizing memory space allocations as illustrated in the following table.

| | | |
|---|---|---|
| FRAME Y | (8*(176*144))*3 | 608256 bits |
| FRAME U | (8*(88*72))*3 | 152064 bits |
| FRAME V | (8*(88*72))*3 | 152064 bits |
| CAMERA Y | ((8*(16*16))*11)*2 | 45056 bits |
| CAMERA U | ((8*(8*8)*11)*2 | 11264 bits |
| CAMERA V | ((8*(8*8)*11)*2 | 11264 bits |
| DELTA Y | 16*(16*16) | 4096 bits |
| DELTA U, V | 16*(8*8)*2 | 2048 bits |
| DCT Y | 16*(16*16) | 4096 bits |
| DCT U, V | 16*(8*8)*2 | 2048 bits |
| TOTAL | | (121 K bytes) 992256 bits |

In this arrangement, the OCM architecture 300 may be implemented utilizing 128K bytes OCM, for example. Other memory arrangements may be utilized in accordance with other aspects of the invention.

FIG. 3B illustrates an exemplary rotating buffer scheme 320 within an on-chip memory (OCM) module that may be utilized in connection with the microprocessor of FIG. 2, for example, in accordance with an embodiment of the invention. Referring to FIG. 3B, the exemplary rotating buffer scheme 320 may be implemented utilizing reference frame buffers within an OCM, such as reference buffers 304 of OCM 300 in FIG. 3A. In an exemplary aspect of the invention, the rotating buffer scheme 320 may utilize three buffers, FRAMEa, FRAMEb, and FRAMEc, in a rotating fashion for simultaneous encoding and decoding of video data within a QCIF-enabled portable video communication device, for example.

During an exemplary video processing cycle, at the start of processing of frame 1, the decoding (DEC) reference may be stored in buffer FRAMEa and the encoding (ENC) reference may be stored in buffer FRAMEc. After encoding frame 1, the encoding result for the current frame, ENC current, may be stored in buffer FRAMEb. After decoding frame 1, the decoding result for the current frame, DEC current, may be stored in buffer FRAMEc.

At the start of processing of frame 2, DEC current in FRAMEc may be utilized as DEC reference. Similarly, ENC current in FRAMEb may be utilized as ENC reference. After encoding frame 2, the encoding result for the current frame, ENC current, may be stored in buffer FRAMEa. After decoding frame 2, the decoding result for the current frame, DEC current, may be stored in buffer FRAMEb.

At the start of processing of frame 3, DEC current in FRAMEb may be utilized as DEC reference. Similarly, ENC current in FRAMEa may be utilized as ENC reference. After encoding frame 3, the encoding result for the current frame, ENC current, may be stored in buffer FRAMEc. After decoding frame 3, the decoding result for the current frame, DEC current, may be stored in buffer FRAMEa.

Figure 3C:
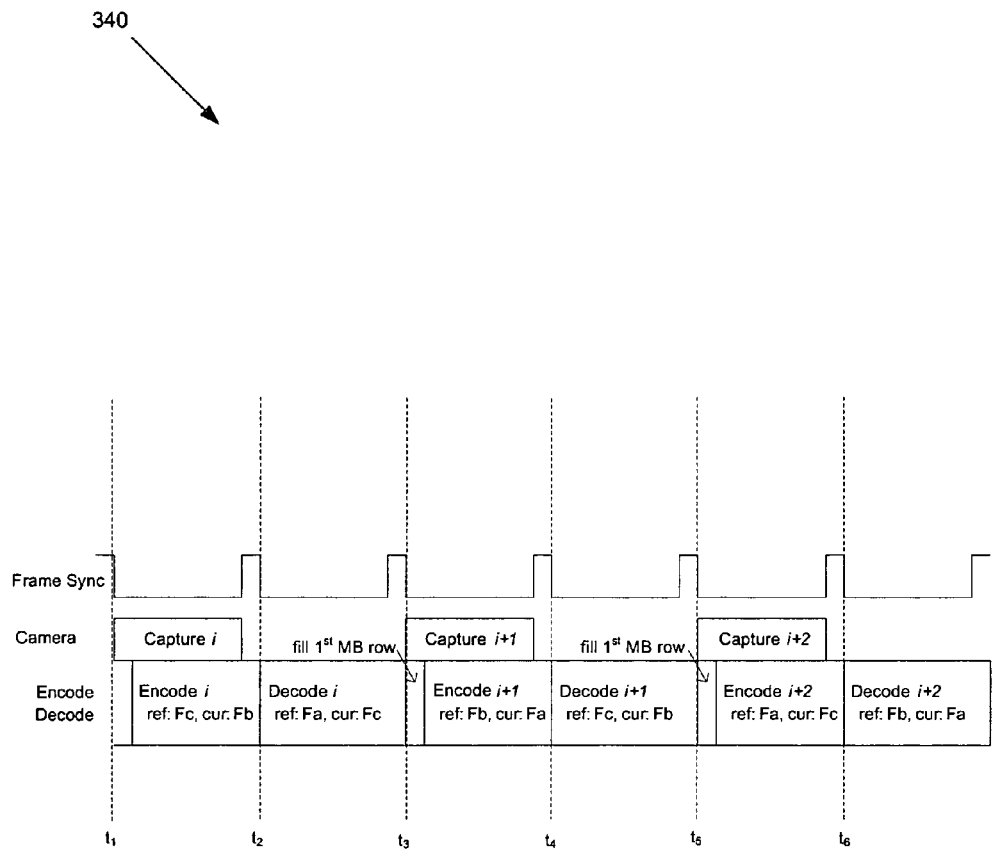
FIG. 3C illustrates an exemplary timing diagram for encoding and decoding within the microprocessor of FIG. 2, for example, in accordance with an embodiment of the invention.

FIG. 3C illustrates an exemplary timing diagram 340 for encoding and decoding within the microprocessor of FIG. 2, for example, in accordance with an embodiment of the invention. Referring to FIG. 3C, the timing diagram 340 may illustrate exemplary video data capturing and simultaneous encoding and/or decoding of the captured video data. In an exemplary aspect of the invention, a portable video communication device may be adapted to process QCIF-formatted video data, where encoding may be performed simultaneously with the capturing of the video data and decoding may be performed after the encoding of the video data. A synchronization rate that is twice the video frame rate may be utilized during processing within the portable video communication device.

Referring to FIGS. 3C and 3B, at time $t_1$, the capturing of the ith frame from camera may be started. After the first row of MB captured, the encoding may be simultaneously started utilizing ENC reference stored in buffer FRAMEc. After encoding, the result ENC current may be stored in FRAMEb and may be utilized during encoding of the subsequent (i+1)th frame captured from camera. At time $t_2$, the encoding of the ith frame captured from camera is completed and the decoding of the ith frame from remote is started. During decoding of the ith frame from remote, a DEC reference in FRAMEa may be utilized and the result may be stored as DEC current in FRAMEc.

At time $t_3$, the capturing of the (i+1)th frame from camera may be started. After the first row of MB captured, the encoding may be simultaneously started utilizing ENC reference stored in FRAMEb. During encoding of the (i+1)th frame, one or more macroblocks from the ith frame in FRAMEb may be utilized for motion estimation. After encoding, the result ENC current may be stored in FRAMEa and may be utilized during encoding of the subsequent (i+2)th frame from camera. At time $t_4$, the encoding of the (i+1)th frame from camera is completed and the decoding of the ith frame from remote is started. During decoding of the (i+1)th frame from remote, a DEC reference in FRAMEc may be utilized and the result may be stored as DEC current in FRAMEb.

At time $t_5$, the capturing of the (i+2)th frame from camera may be started. After the first row of MB captured, the encoding may be simultaneously started utilizing an ENC reference stored in FRAMEa. During encoding of the (i+2)th frame, one or more macroblocks from the (i+1)th frame in FRAMEa may be utilized for motion estimation. After encoding, the result ENC current may be stored in FRAMEc and may be utilized during encoding of the subsequent (i+3)th frame from camera. At time $t_6$, the encoding of the (i+2)th frame from camera is completed and the decoding of the (i+2)th frame from remote is started. During decoding of the (i+2)th frame from remote, a DEC reference in FRAMEb may be utilized and the result may be stored as DEC current in FRAMEa.

Figure 3D:
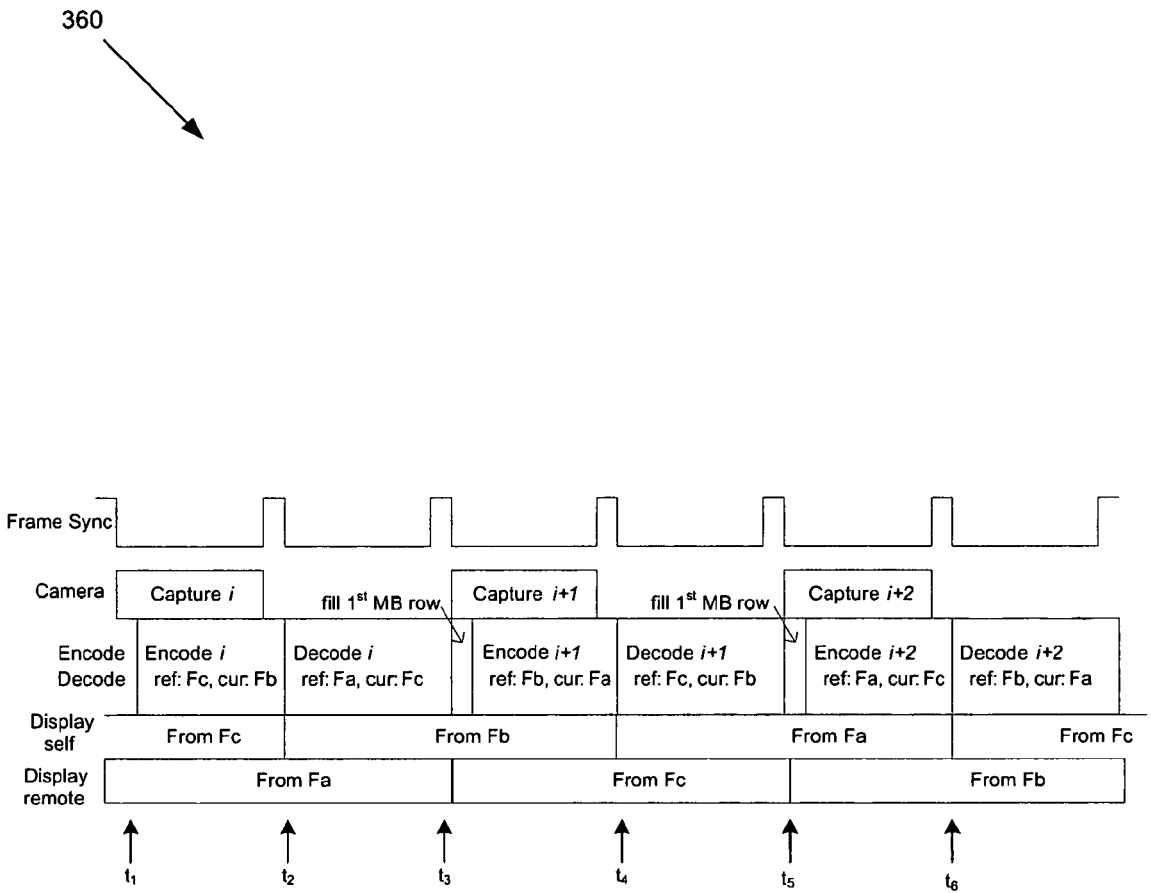
FIG. 3D illustrates an exemplary timing diagram for QCIF dual video display in connection with the microprocessor of FIG. 2, for example, in accordance with an embodiment of the invention.

FIG. 3D illustrates an exemplary timing diagram 360 for QCIF dual video display in connection with the microprocessor of FIG. 2, for example, in accordance with an embodiment of the invention. Referring to FIGS. 2, 3C and 3D, an exemplary portable video communication device may utilize the microprocessor architecture 200 and simultaneously capture, encode and decode one or more video frames from QCIF-formatted video data. In one aspect of the invention, during a two-way video communication, such as a video telephone connection utilizing QCIF-compatible portable video devices, each portable video processing device may be adapted to display QCIF-formatted data of a sender and a recipient party. For example, a first portable video processing device may capture video frames, as illustrated on FIG. 3C, and may simultaneously display in a QCIF format the user of the first device, which may be represented as "display self" in FIG. 3D, as well as display in a QCIF format the user of the second portable video communication device, which may be represented as "display remote" in FIG. 3D.

In another aspect of the invention, "display self" QCIF-formatted video data may be acquired from an ENC current buffer. Similarly, "display remote" QCIF-formatted video data may be acquired from a DEC current buffer. In this manner, "display self" QCIF-formatted data may be acquired from buffer FRAMEc for time period $t_1$ through $t_2$, from FRAMEb for time period $t_2$ through $t_4$, and from FRAMEa for time period $t_4$ through $t_6$, for example. Similarly, "display remote" QCIF-formatted data may be acquired from buffer FRAMEa for time period $t_1$ through $t_3$, from FRAMEc for time period $t_3$ through $t_5$, and from FRAMEb for time period $t_5$ through $t_7$ (not illustrated), for example.

Figure 4:
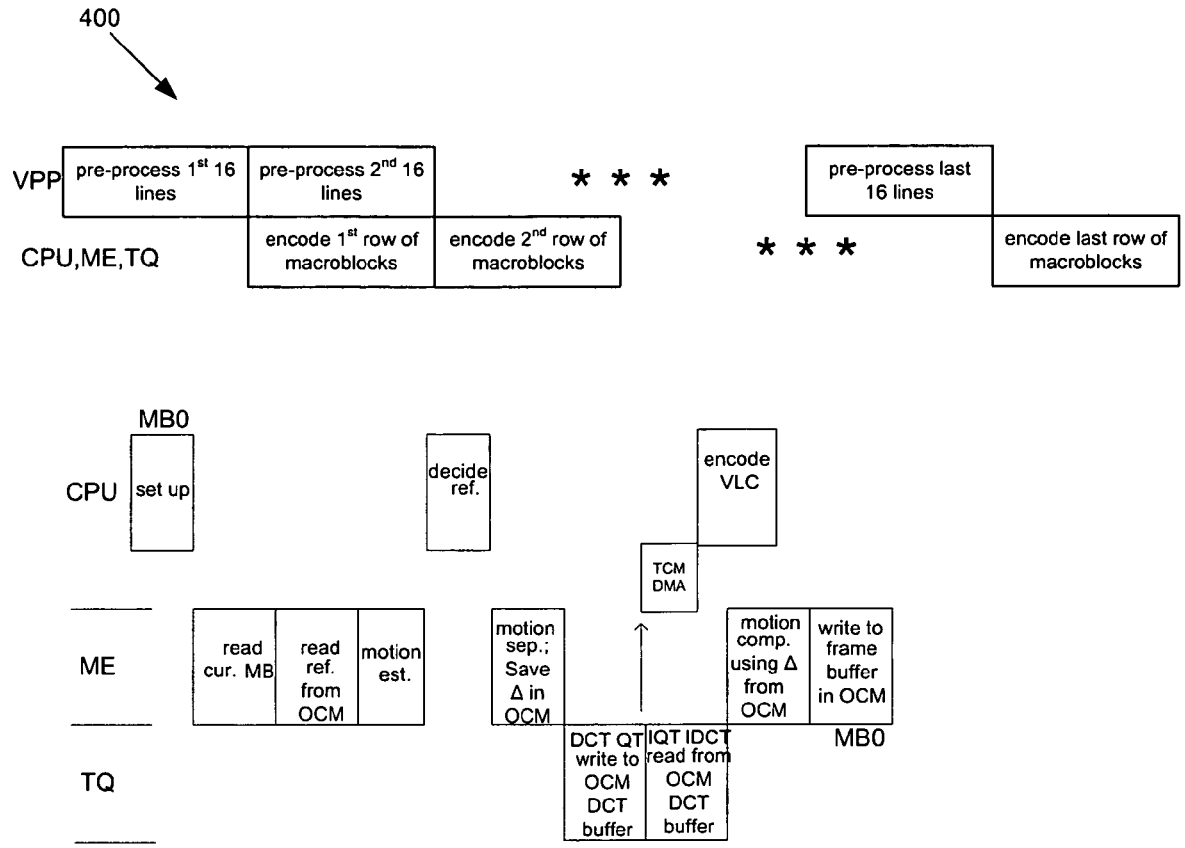
FIG. 4 is an exemplary timing diagram illustrating macroblock processing during video encoding via the microprocessor of FIG. 2, for example, in accordance with an embodiment of the invention.

FIG. 4 is an exemplary timing diagram illustrating macroblock processing during video encoding via the microprocessor of FIG. 2, for example, in accordance with an embodiment of the invention. Referring to FIGS. 2, 3A, and 4, for example, the QCIF camera data may be communicated from the camera 242 to the VPP accelerator 208 via the CAMI 220 and the system bus 244. Captured video data may be stored within a line buffer, for example, within the CAMI 220. The VPP accelerator 208 may then convert the captured camera data to a YUV-format and store the result in buffer 302 within the OCM 214 in a line-by-line sequence. After one row of macroblocks have been filled with YUV-formatted data, the CPU 202, ME 212, and TQ 208 may start encoding of the macroblocks in the filled row and the VPP 208 may continue storing YUV-formatted data of the next row of macroblocks in the other buffer.

In an exemplary aspect of the invention, for each macroblock, the CPU 202 may first set up the microprocessor architecture 200 for encoding a current macroblock. The ME accelerator 212 may then acquire YUV-formatted data for current macroblock from buffer 302 within the OCM 214 and may store the current macroblock data in a local memory inside ME. The ME accelerator 212 may then acquire from buffer 304 luminance (Y) data in the motion search area of the current macroblock. During motion estimation, the ME accelerator 212 may compare current macroblock with possible motion reference candidates in the search area from buffer 304, and the CPU 202 may be utilized to select the final motion reference for the current macroblock.

After the motion reference for current macroblock has been selected, the ME accelerator 212 may generate one or more estimation errors during motion separation based on a delta, or a difference, between the current macroblock and the selected motion reference. The generated delta and/or estimation error information may be stored in buffer 306 in OCM 214 for subsequent processing by the TQ accelerator 210. The TQ accelerator 210 may discrete cosine transform and quantize the estimation errors to obtain quantized frequency coefficients. The quantized frequency coefficients may then be communicated to buffer 308 in OCM 214 for storage and subsequent encoding in a VLC bitstream, for example. The quantized frequency coefficients may then be inverse quantized and inverse discrete cosine transformed by the TQ accelerator 210 to generate estimation errors. The generated estimation errors may be stored back in buffer 306 in the OCM 214 for subsequent utilization by the ME accelerator 212 during motion compensation.

The ME accelerator 212 may then reconstruct the current macroblock based on the reference macroblock information stored in the reference buffers 304 and the generated delta and/or estimation error information stored in buffer 306 in the OCM 214. After the current macroblock is reconstructed by the ME accelerator 212, the reconstructed macroblock may be stored in a buffer 304 in the OCM 214 to be utilized as a reference macroblock during a subsequent operation cycle.

After quantized frequency coefficients information is stored in buffer 308 in OCM 214, the CPU 202 may utilize DMA 230 to move the frequency coefficients into TCM 204 and encode the quantized frequency coefficients into a VLC bitstream, for example. In an exemplary aspect of the invention, the CPU 202 and the accelerators VPP 208, TQ 210, and ME 212 may be utilized to process QCIF-formatted video data in a parallel and/or pipeline fashion to achieve faster and more efficient encoding of video data.

Figure 5:
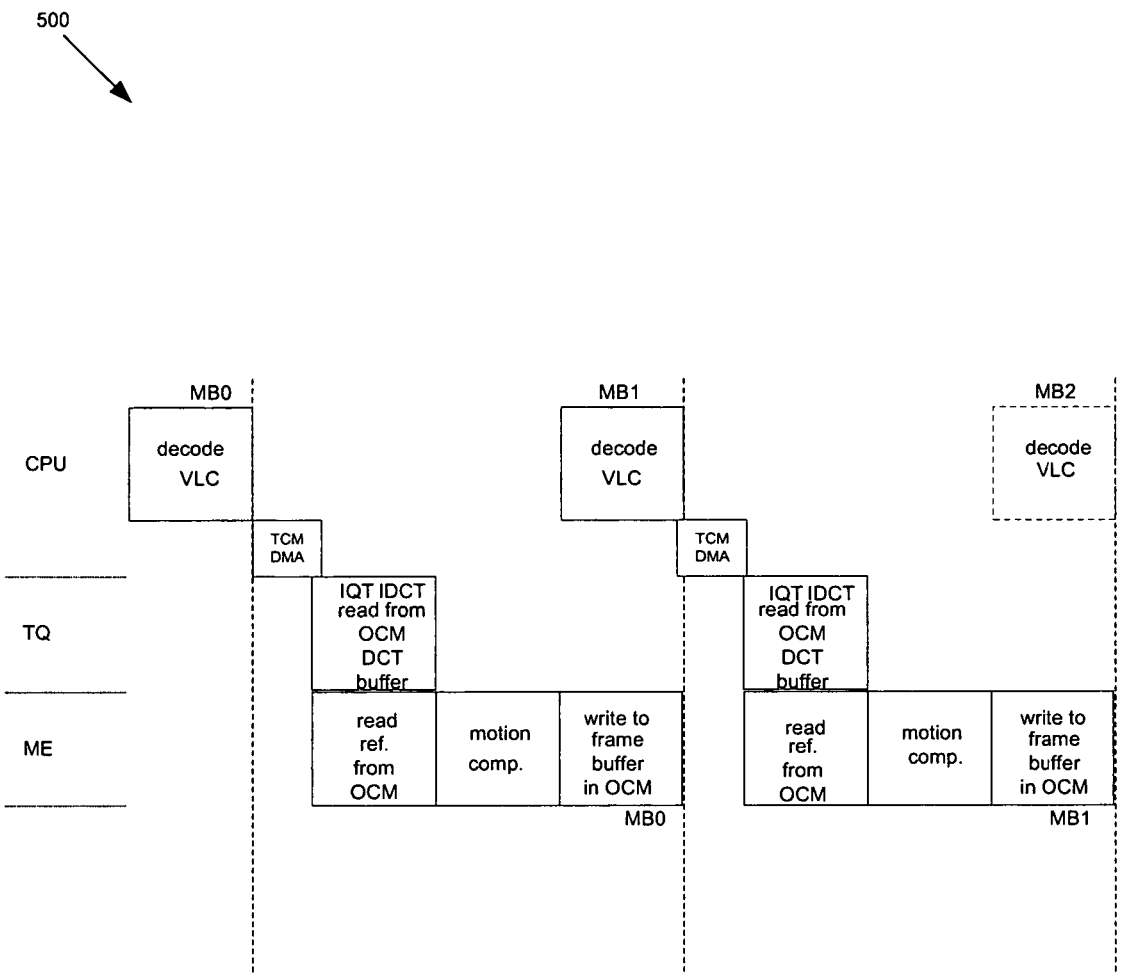
FIG. 5 is an exemplary timing diagram illustrating video decoding via the microprocessor of FIG. 2, for example, in accordance with an embodiment of the invention.

FIG. 5 is an exemplary timing diagram illustrating video decoding via the microprocessor of FIG. 2, for example, in accordance with an embodiment of the invention. Referring to FIGS. 2, 3A, and 5, for each macroblock MB0, the CPU 202 may decode the frequency coefficients of a current encoded macroblock MB0 from a current VLC encoded frame within an elementary video bitstream received from remote. For example, the current VLC encoded frame may be stored within buffer in the TCM 204. The CPU 202 may then decode the current macroblock MB0 and generate one or more quantized frequency coefficients. The generated quantized frequency coefficients may be stored in buffer 308 in OCM 214, may be transferred by DMA 230, for subsequent communication to the TQ accelerator 210.

The TQ accelerator 210 may acquire the quantized frequency coefficients from buffer 308 in the OCM 214 and may inverse quantize and inverse discrete cosine transform the quantized frequency coefficients to generate one or more estimation errors and/or delta information. The generated delta and/or estimation error information may be stored in buffer 306 in the OCM 214. While the TQ accelerator 210 generates the estimation error, the ME accelerator 212 may acquire the motion reference of MB0 from the reference buffer 304 in OCM 214.

The ME accelerator 212 may then reconstruct the current macroblock MB0 utilizing the acquired motion reference from buffer 304 and the generated estimation errors stored in buffer 306 in the OCM 214. The reconstructed macroblock MB0 may be stored in buffer 304 to be utilized as a reference macroblock during the decoding of a subsequent frame. In an exemplary aspect of the invention, some of the tasks performed by the CPU 202 and the accelerators VPP 208, TQ 210, and ME 212 may be performed simultaneously and/or in a pipeline fashion to achieve faster and more efficient encoding of video data. For example, the CPU 202 may start decoding the VLC bitstream of a subsequent macroblock MB1 after the TQ has processed MB0 frequency coefficients in the buffer 308.

After one row of macroblocks have been decoded, the VPP accelerator 208 may obtain the decoded macroblocks from buffer 304 in the OCM 214 and may convert the YUV-formatted macroblocks to an RGB format in a line-by-line sequence for subsequent displaying by a QCIF-compatible portable video communication device, for example. The RGB-formatted lines may be communicated to the DSPI 218 and the DSPI 218 may then communicate the acquired RGB-formatted lines to the video display 240 for displaying.

Figure 6:
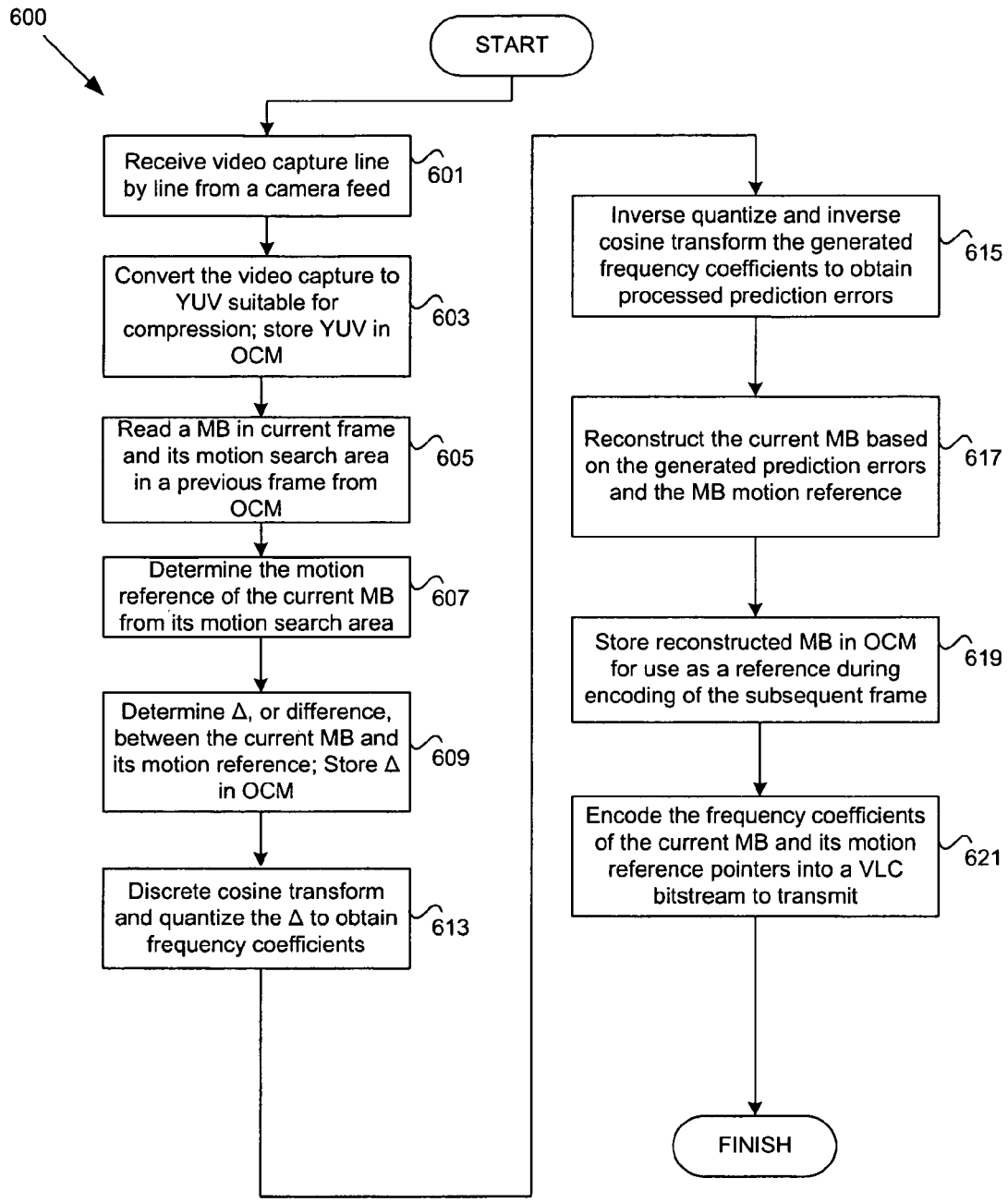
FIG. 6 is a flow diagram of an exemplary method for compression of video information, in accordance with an embodiment of the invention.

FIG. 6 is a flow diagram of an exemplary method 600 for compression of video information, in accordance with an embodiment of the invention. Referring to FIG. 6, at 601, video capture may be received within a microprocessor from a source, such as a camera feed, in a line-by-line sequence. The microprocessor may be utilized within a portable video communication device, such as a QCIF-enabled device. At 603, the captured video frames may be converted to a YUV format by one or more hardware accelerators within the microprocessor and may be subsequently stored in an on-chip memory (OCM) in a format suitable for compression. At 605, for each MB in a current frame, a current macroblock and its motion search area in the previous frame may be acquired from the OCM. At 607, the motion reference of the current macroblock may be determined from its motion search area stored in the OCM. At 609, a delta, or a difference, may be determined between the current MB and its motion reference. The delta may then be stored in a buffer in the OCM.

At 613, the delta may be discrete cosine transformed and quantized to generate quantized frequency coefficients. At 615, the generated quantized frequency coefficients may be inverse quantized and inverse discrete cosine transformed to generate estimation errors. At 617, the current macroblock may be reconstructed by one or more of the hardware accelerators based on the generated estimation errors and the current macroblock motion reference. At 619, the reconstructed macroblock may be stored in a reference buffer in the OCM and may be utilized as a reference macroblock during encoding of the subsequent frame. At 621, the quantized frequency coefficients of the current macroblock may be VLC encoded and packed into a bitstream.

Figure 7:
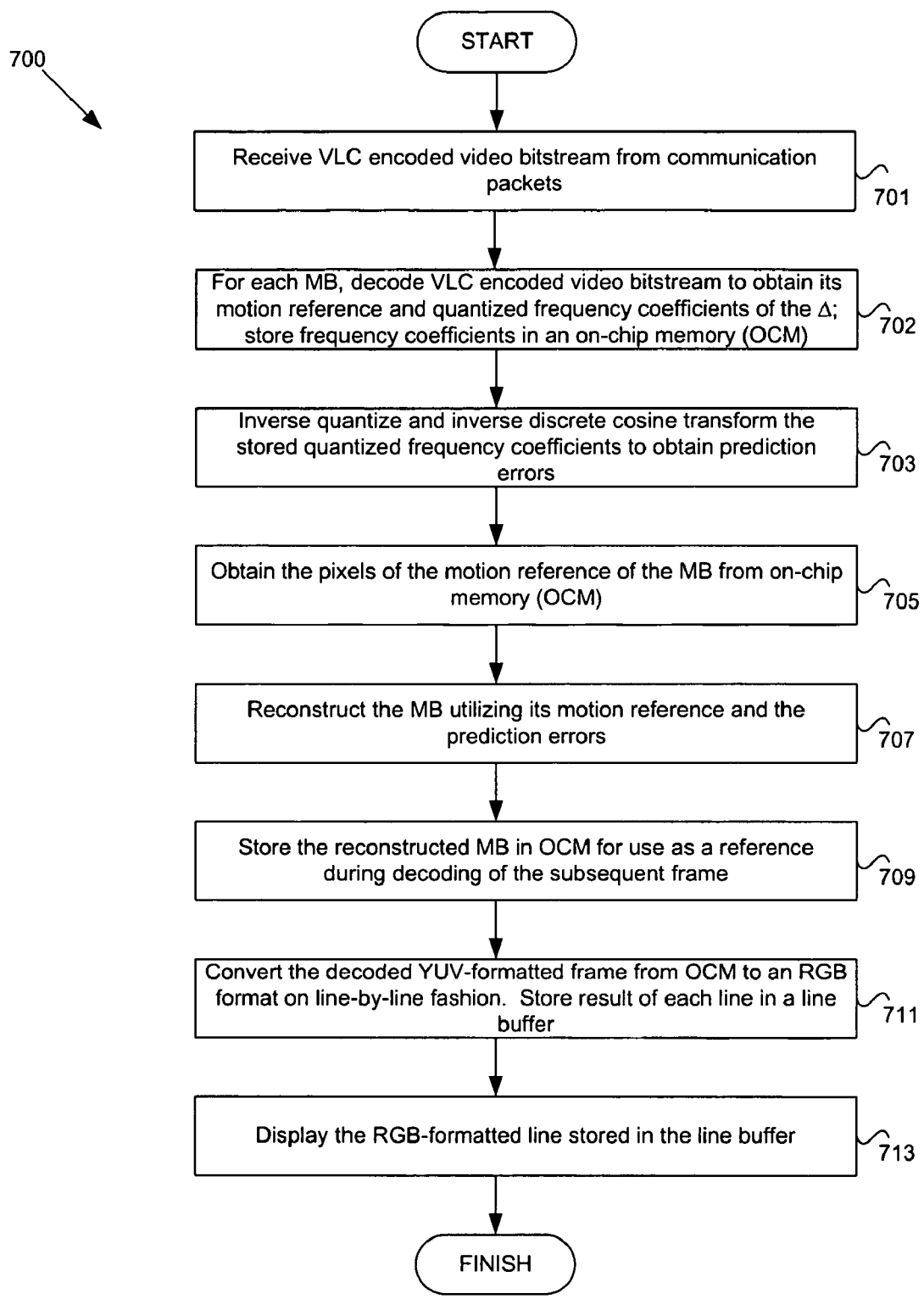
FIG. 7 is a flow diagram of an exemplary method for decompression of video information, in accordance with an embodiment of the invention.

FIG. 7 is a flow diagram of an exemplary method for decompression of video information, in accordance with an embodiment of the invention. Referring to FIG. 7, at 701, VLC encoded video bitstream may be received from communication packets. At 702, a VLC encoded video stream may be decoded to generate the quantized frequency coefficients of the MB and its motion reference. The generated quantized frequency coefficients may be stored in a buffer in an on-chip memory (OCM) shared by on-chip hardware accelerators. At 703, the stored quantized frequency coefficients may be inverse quantized and inverse discrete cosine transformed to obtain estimation errors. At 705, the motion reference of the current macroblock may be acquired from a reference buffer in the OCM, for example. At 707, a decoded macroblock may be reconstructed utilizing the estimation errors of the MB and its motion reference. At 709, the decoded macroblock may be stored in the reference buffer in the OCM so that the decoded macroblock may be utilized as a reference macroblock during decoding of the subsequent frame. At 711, the decoded YUV-formatted frame may be converted line by line to an RGB format suitable for display. The RGB-formatted data may then be stored in a display line buffer. A display line buffer may be provided as part of a QCIF display interface in a portable video communication device. At 713, the RGB-formatted line may be communicated from the display line buffer to a video display for displaying. The RGB-formatted line may then be displayed by the video display.

Accordingly, aspects of the invention may be realized in hardware, software, firmware or a combination thereof. The invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

One embodiment of the present invention may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method for processing video data, the method comprising:
    receiving a first video frame and a second video frame;
    storing said received first video frame and said received second video frame in a memory;
    decoding said stored first video frame during a video processing cycle using a plurality of reference buffers;
        encoding said stored second video frame during said video processing cycle using said plurality of reference buffers; and
        sharing said plurality of reference buffers between said decoding and said encoding in a rotating fashion.

2. The method according to claim 1, further comprising converting said received second video frame from an input video format to a YUV video format before encoding said stored second video frame.

3. The method according to claim 2, wherein said encoding said stored second video frame further comprises identifying a reference frame in said plurality of reference buffers corresponding to said converted second video frame.

4. The method according to claim 3, wherein said encoding said stored second video frame further comprises determining an estimation error based on a difference between a macroblock (MB) in said identified reference frame and a motion reference for said MB in said identified reference frame.

5. The method according to claim 4, wherein said encoding said stored second video frame further comprises discrete cosine transforming and quantizing said determined estimation error.

6. The method according to claim 5, wherein said encoding said stored second video frame further comprises encoding said converted second video frame based on said discrete cosine transformed and quantized estimation error.

7. The method according to claim 5, wherein said encoding said stored second video frame further comprises inverse quantizing and discrete cosine transforming said discrete cosine transformed and quantized estimation error.

8. The method according to claim 7, wherein said encoding said stored second video frame further comprises generating a reconstructed reference frame based on said inverse quantized and inverse discrete cosine transformed estimation error.

9. The method according to claim 1, comprising decoding said encoded stored second video frame.

10. The method according to claim 9, comprising inverse quantizing and inverse discrete cosine transforming a discrete cosine transformed and quantized estimation error corresponding to said decoded stored second video frame.

11. The method according to claim 1, wherein sharing said plurality of reference buffers between said decoding and said encoding in a rotating fashion comprises utilizing a decoding reference frame stored in a first reference buffer of said reference buffers to decode said stored first video frame during said video processing cycle.

12. The method according to claim 11, wherein sharing said plurality of reference buffers between said decoding and said encoding in a rotating fashion further comprises utilizing an encoding reference frame stored in a second reference buffer of said reference buffers to encode said stored second video frame during said video processing cycle.

13. The method according to claim 12, wherein sharing said plurality of reference buffers between said decoding and said encoding in a rotating fashion further comprises storing said decoded stored first video frame in said second reference buffer as a next decoding reference frame for decoding a video frame that comes after the stored first video frame.

14. The method according to claim 13, wherein sharing said plurality of reference buffers between said decoding and said encoding in a rotating fashion further comprises storing said encoded stored second video frame in a third reference buffer of said reference buffers as a next encoding reference frame for encoding a video frame that comes after the stored second video frame.

15. The method according to claim 14, wherein sharing said plurality of reference buffers between said decoding and said encoding in a rotating fashion further comprises using said next decoding reference frame stored in said second reference buffer to decode said video frame that comes after the stored first video frame during a next video processing cycle.

16. The method according to claim 15, wherein sharing said plurality of reference buffers between said decoding and said encoding in a rotating fashion further comprises using said next encoding reference frame stored in said third reference buffer to encode said video frame that comes after the stored second video frame during said next video processing cycle.

17. The method according to claim 16, wherein sharing said plurality of reference buffers between said decoding and said encoding in a rotating fashion further comprises storing said decoded video frame that comes after the stored first video frame in said third reference buffer as another next decoding reference frame.

18. The method according to claim 17, wherein sharing said plurality of reference buffers between said decoding and said encoding in a rotating fashion further comprises storing said encoded video frame that comes after the stored second video frame in said first reference buffer as another next encoding reference frame.

19. The method according to claim 1, wherein sharing said plurality of reference buffers between said decoding and said encoding in a rotating fashion comprises performing said decoding of said stored first video frame after said encoding of said stored second video frame during said video processing cycle.

20. The method according to claim 1, wherein sharing said plurality of reference buffers between said decoding and said encoding in a rotating fashion comprises synchronizing said decoding and/or said encoding at twice the rate of a video frame rate for said receiving of said first video frame and/or said second video frame.

21. A method for processing video data, the method comprising:
    encoding video data from a video source using a plurality of reference buffers in a memory segmented into a plurality of segments; and
    decoding other video data using the plurality of reference buffers in said segmented memory,
    wherein, during a video processing cycle, said segmented memory is utilized to store processing results prior to, during or after said decoding and/or said encoding, and said plurality of reference buffers are shared between said decoding and said encoding in a rotating fashion.

22. The method according to claim 21, further comprising generating YUV-formatted video data using the video data from said video source before encoding said video data from said video source.

23. The method according to claim 21, wherein said encoding further comprises storing an encoding reference frame corresponding to said video data from said video source in said plurality of reference buffers.

24. The method according to claim 23, wherein said encoding further comprises encoding said video data from said video source using said stored encoding reference frame.

25. The method according to claim 21, wherein said decoding further comprises storing a decoding reference frame corresponding to said other video data in said plurality of reference buffers.

26. The method according to claim 25, wherein said decoding further comprises decoding said other video data using said stored decoding reference frame.

27. The method according to claim 21, further comprising converting at least a portion of said decoded other video data to a RGB video format.

28. A system for processing video data, the system comprising:
    at least one processor configured to receive a first video frame and a second video frame;
    said at least one processor configured to store said received first video frame and said received second video frame in a memory;
    said at least one processor configured to decode said stored first video frame during a video processing cycle;
    said at least one processor configured to encode said stored second video frame during said video processing cycle; and
    a plurality of reference buffers configured to be shared by the processor, in a rotating fashion, between decoding said stored first video frame and said encoding said stored second video frame during said video processing cycle.

29. The system according to claim 28, wherein said at least one processor is configured to convert said received second video frame from an input video format to a YUV video format before encoding said stored second video frame.

30. The system according to claim 29, wherein said at least one processor is configured to identify a reference frame in said plurality of reference buffers corresponding to said converted second video frame.

31. The system according to claim 30, wherein said at least one processor is configured to determine an estimation error based on a difference between a macroblock (MB) in said identified reference frame and a motion reference for said MB in said identified reference frame.

32. The system according to claim 31, wherein said at least one processor is configured to discrete cosine transform and quantize said determined estimation error.

33. The system according to claim 32, wherein said at least one processor is configured to encode said converted second video frame based on said discrete cosine transformed and quantized estimation error.

34. The system according to claim 32, wherein said at least one processor is configured to inverse quantize and inverse discrete cosine transform said discrete cosine transformed and quantized estimation error.

35. The system according to claim 34, wherein said at least one processor is configured to generate a reconstructed reference frame based on said inverse quantized and inverse discrete cosine transformed estimation error.

36. The system according to claim 28, wherein said at least one processor is configured to decode said encoded stored second video frame.

37. The system according to claim 36, wherein said at least one processor is configured to inverse quantize and inverse discrete cosine transform a discrete cosine transformed and quantized estimation error corresponding to said decoded stored second video frame.

* * * * *